(12) United States Patent
Nakamura

(10) Patent No.: US 7,742,047 B2
(45) Date of Patent: Jun. 22, 2010

(54) IMAGE PROCESSING PROGRAM AND IMAGE PROCESSING SYSTEM USING SAME

(75) Inventor: Tomoaki Nakamura, Ohta-ku (JP)

(73) Assignee: Sega Corporation, Tokyo (JP)

( * ) Notice: Subject to any disclaimer, the term of this patent is extended or adjusted under 35 U.S.C. 154(b) by 120 days.

(21) Appl. No.: 12/075,153

(22) Filed: Mar. 10, 2008

(65) Prior Publication Data

US 2008/0225050 A1    Sep. 18, 2008

Related U.S. Application Data

(63) Continuation of application No. PCT/JP2006/316995, filed on Aug. 29, 2006.

(30) Foreign Application Priority Data

Sep. 8, 2005    (JP) .............................. 2005-261326

(51) Int. Cl.
*G06T 15/60*    (2006.01)
(52) U.S. Cl. ........................ 345/426; 345/428; 345/582
(58) Field of Classification Search ........................ None
See application file for complete search history.

(56) References Cited

U.S. PATENT DOCUMENTS

| | | | |
|---|---|---|---|
| 6,016,150 A * | 1/2000 | Lengyel et al. ............. 345/426 |
| 6,798,408 B2 | 9/2004 | Tokuyama et al. | |
| 6,924,798 B2 * | 8/2005 | Marshall et al. ............. 345/419 |
| 6,971,957 B2 | 12/2005 | Osako | |
| 7,071,949 B1 * | 7/2006 | Drucker et al. ............. 345/582 |
| 7,102,639 B2 * | 9/2006 | Oka .......................... 345/428 |
| 7,307,631 B2 * | 12/2007 | Robart ....................... 345/426 |

FOREIGN PATENT DOCUMENTS

| | | |
|---|---|---|
| JP | 2002-42165 | 2/2002 |
| JP | 2002-190032 | 7/2002 |
| JP | 2003-85591 | 3/2003 |
| JP | 2004-13621 | 1/2004 |

* cited by examiner

*Primary Examiner*—Ulka Chauhan
*Assistant Examiner*—Andrew Yang
(74) *Attorney, Agent, or Firm*—Jordan and Hamburg LLP

(57) ABSTRACT

By means of an image drawing program stored in a storage medium readable by an image processing system, the corresponding image processing system and the corresponding image drawing method, shadows are drawn for a plurality of characters, without imposing a large load on the processor, by referencing a shadow created in advance, and using the shadow for other characters to draw numerous humanoid shadows for display on one screen.

17 Claims, 12 Drawing Sheets

FIG.5

CHARACTER LIST

| SORT ORDER | CHARACTER ID |
|---|---|
| (1) | CHARACTER ID 1 |
| (2) | CHARACTER ID 2 |
| (3) | CHARACTER ID 3 |
| (4) | CHARACTER ID 4 |
| (5) | CHARACTER ID 5 |
| ⋮ | ⋮ |
| (n−1) | CHARACTER ID n-1 |
| (n) | CHARACTER ID n |

FIG.6

POSE TABLE

| POSE ID | CHARACTER |
|---|---|
| FALLEN | CHARACTER ID 1 <br> CHARACTER ID 6 <br> CHARACTER ID 7 |
| READY | CHARACTER ID 0 <br> CHARACTER ID 2 <br> CHARACTER ID 3 <br> CHARACTER ID 4 <br> CHARACTER ID 5 <br> CHARACTER ID 9 <br> CHARACTER ID 11 |
| RISING | CHARACTER ID 8 <br> CHARACTER ID 10 |

FIG.7

MOTION TABLE

| MOTION NO. | POSE ID |
|---|---|
| MOTION 1 | FALLEN ID |
| MOTION 2 | READY ID |
| MOTION 3 | FALLEN ID |
| MOTION 4 | RISING ID |
| ⋮ | |
| MOTION m | FALLEN ID |
| MOTION m+1 | READY ID |
| MOTION m+2 | READY ID |
| ⋮ | |
| MOTION n-1 | READY ID |
| MOTION n | FALLEN ID |

FIG.8

| | | | | | |
|---|---|---|---|---|---|
| I | ORIGINAL SHADOWS | FALLEN 6 | READY 0 | RISING 8 | FALLEN 2 |
| II | REFERENCE SHADOWS | FALLEN 7 | READY 9 | | |
| | | | READY 3 | | |
| | | | READY 5 | | |
| | | | READY 4 | | |

FIG.12

| | |
|---|---|
| CH 1 | ACTUAL SHADOW |
| CH 2 | ACTUAL SHADOW |
| CH 3 | ACTUAL SHADOW |
| CH 4 | ACTUAL SHADOW |
| CH 5 | REFERENCE SHADOW REFERENCING VIRTUAL ACTUAL SHADOW 1 |
| CH 6 | REFERENCE SHADOW REFERENCING VIRTUAL ACTUAL SHADOW 1 |
| CH 7 | REFERENCE SHADOW REFERENCING VIRTUAL ACTUAL SHADOW 1 |
| CH 8 | REFERENCE SHADOW REFERENCING VIRTUAL ACTUAL SHADOW 1 |
| CH 9 | REFERENCE SHADOW REFERENCING VIRTUAL ACTUAL SHADOW 1 |
| CH 10 | REFERENCE SHADOW REFERENCING VIRTUAL ACTUAL SHADOW 1 |
| CH 11 | ACTUAL SHADOW (BECAUSE THERE ARE NO OTHER CHARACTERS IN THE SAME POSE CATEGORY) |
| CH 12 | REFERENCE SHADOW REFERENCING CH 2 ACTUAL SHADOW |
| CH 13 | REFERENCE SHADOW REFERENCING VIRTUAL ACTUAL SHADOW 2 |
| CH 14 | REFERENCE SHADOW REFERENCING VIRTUAL ACTUAL SHADOW 2 |
| CH 15 | APPROXIMATE SHADOW |
| CH 16 | APPROXIMATE SHADOW |
| CH 17 | APPROXIMATE SHADOW |
| CH 18 | APPROXIMATE SHADOW |
| CH 19 | APPROXIMATE SHADOW |
| CH 20 | NO SHADOW |
| CH 21 | NO SHADOW |
| CH 22 | NO SHADOW |

IMAGE PROCESSING PROGRAM AND IMAGE PROCESSING SYSTEM USING SAME

CROSS REFERENCE TO RELATED APPLICATIONS

This application is a continuation of International Application No. PCT/JP2006/316995, filed on Aug. 29, 2006, now pending, herein incorporated by reference. Further, this application is based upon and claims the benefit of priority from the prior Japanese Patent Application No. 2005-261326, filed on Sep. 8, 2005, the entire contents of which are incorporated herein by reference.

BACKGROUND OF THE INVENTION

The present invention relates to an image processing program, and an image processing system using this program, and in particular relates to a game program which enables reduction of the processing load for shadow texturing in a game system, which is one mode of such an image processing system.

In a game system which is one mode of an image processing system, model-type shadows (hereafter simply called "humanoid shadows") of humans, animals, fantasy creatures, robots, and similar are displayed, accompanying characters displayed on a display screen (representing objects which perform fighting in an action game) and moving in accordance with character movements.

Drawing of such humanoid shadows is achieved by performing calculations and creating shadow texture for each frame, based on the character model and on the motion thereof, and then applying this to a polygon constituting the surface. At this time, calculations and creation must be performed for the number of characters to be displayed on one screen.

Hence the greater the number of characters to be displayed in one screen of an action game or similar, the greater is the load on the drawing processor which performs drawing processing.

Thus in drawing character shadows, as the number of characters displayed within one screen increases, the load of character motion calculations and shadow model drawing increases, and occurrence of incomplete processing increase.

One conceivable method for dealing with this problem is to simplify the form of the shadow to be drawn, employing for example approximate shadows. When drawing with approximate shadows, a shadow texture is not generated, so that there is no load resulting from shadow texture generation.

However, if approximate shadows are used uniformly, then approximate shadows are drawn as shadows for drawings when characters have fallen down and in similar cases, imparting a sense of unnaturalness to the game player.

As a method of forming shadows in a game system, the technology disclosed in Japanese Patent Laid-open No. 2002-190032 is known. The invention disclosed in this patent reference has the characteristic that shadows formed by a character itself are generated and displayed in realtime when projecting shadows of the character onto other portions.

Further, the invention disclosed in this Japanese Patent Laid-open No. 2002-190032 makes no mention of a solution to the problem, described above, in which the greater the number of characters displayed on one screen, the greater is the load on the drawing processor to perform drawing.

SUMMARY OF THE INVENTION

Hence an object of the invention is to provide a game program which enables drawing without imposing a large load on the processor even in cases in which numerous humanoid shadows are to be generated for display on one screen, without sacrificing the quality of the shadows, as well as a game system using such a program.

A first aspect of the invention to attain the above object is an image drawing program, which is executed by an image processing system having: a drawing processor which generates character image data corresponding to character data read from memory; texture memory which stores textures to be applied to characters; and frame memory to which characters applied with the textures are drawn, and which executes control to cause the drawing processor to display, on a display screen of the image processing system, an image of a plurality of characters positioned in virtual three-dimensional space in a view from a prescribed viewpoint, the image resulting from perspective projection onto a two-dimensional plane, the image drawing program being characterized in causing execution, by the drawing processor, of a step of performing perspective projection of a plurality of characters from a viewpoint set in virtual three-dimensional space, and forming character image data corresponding to the character data; a step of drawing the character image data formed by the drawing processor in frame memory; a step of causing the drawing processor, when images of shadows to be displayed corresponding to images of characters drawn in frame memory are drawn, to generate the texture of a shadow to be applied corresponding to the shadow of one character, and to store the texture in texture memory; and, a step of using the shadow texture, stored in texture memory and to be applied corresponding to the one character and, to draw the texture of shadows of characters to be drawn, which are set to the same pose category as the one character.

A second aspect of the invention to attain the above object is an image processing system, which has: a drawing processor which generates character image data corresponding to character data read from memory; texture memory which stores textures to be applied to characters; and frame memory to which characters applied with the textures are drawn, and which executes control by means of an image drawing program to cause the drawing processor to display, on a display screen of the image processing system, an image of a plurality of characters positioned in a virtual three-dimensional space in a view from a prescribed viewpoint, the image resulting from perspective projection onto a two-dimensional plane, the image processing system having: a drawing processor, which performs perspective projection from a viewpoint set in virtual three-dimensional space of the plurality of characters and forms character image data corresponding to the character data; frame memory in which is drawn an image of characters by means of the character image data formed by the drawing processor; and texture memory which stores textures to be applied when drawing the character image in frame memory, the image processing system being characterized in that, when images of shadows to be displayed corresponding to images of characters drawn in frame memory are drawn by the drawing processor, the drawing processor generates the texture of a shadow to be applied corresponding to a shadow of one character, stores the texture in texture memory, and uses the shadow texture, stored in the texture memory and to be applied corresponding to the one character and to draw the texture of shadows of characters to be drawn, which are set to the same pose category as the one character.

Further, this invention is characterized in that the shadow of one character is a character shadow, not actually drawn on the screen, which, for a prescribed parameter, matches the conditions of the parameter selected such that the number of characters which can be used as a reference shadow is increased.

The virtual character shadow which is not actually drawn on the screen is characterized in that, when the prescribed parameter is an angle, the shadow is a virtual character shadow at an angle selected such that the number of characters which can be used as a reference shadow, within a prescribed angular difference allowable range, is increased.

Further, this invention is characterized in that, when a character to be drawn, which is set in the same pose category as the one character, and the direction toward a specific coordinate position in the virtual three-dimensional space is not within a prescribed range, the drawing processor is caused to generate the texture of the shadow to be applied corresponding to the shadow of the character to be drawn itself.

Further, this invention is characterized in that, when causing the drawing processor to draw images of shadows to be displayed corresponding to character images drawn in the frame memory, a shadow of a character in a position distant by a prescribed distance or greater from a specific coordinate position in the virtual three-dimensional space is drawn in the frame memory by applying a texture in a prescribed shape, stored in advance in the texture memory.

Moreover, this invention is characterized in that, when causing the drawing processor to draw images of shadows to be displayed corresponding to character images drawn in the frame memory, the shadows of characters the display size on the display screen (not limited to length, but taking "size" with reference to area or to volume as well) of which is equal to or smaller than a prescribed size are drawn in frame memory by applying a texture in a prescribed shape, which is stored in advance in the texture memory.

Further, this invention is characterized in that the shadow texture to be applied corresponding to the one character stored in the texture memory is enlarged, reduced, and rotated, according to the size and orientation of the corresponding character.

Further, this invention is characterized in that, when causing the drawing processor to draw images of shadows displayed corresponding to character images drawn in the frame memory, control is executed such that a texture of prescribed shape, stored in advance in the frame memory, is applied and shadows drawn in frame memory for characters positioned in a range equal to or greater than a first distance from and up to a second distance from a specific coordinate position in the virtual three-dimensional space, and such that shadow drawing is not performed for characters in positions at a distance equal to or greater than the second distance.

Characteristics of the invention will become clearer through the aspects of the invention explained below, referring to the drawings.

By means of this invention, shadows can be drawn for a plurality of characters, without imposing a large load on the processor, by referencing a shadow created in advance, and using the shadow for other characters to draw numerous humanoid shadows for display on one screen.

BRIEF DESCRIPTION OF THE DRAWINGS

FIG. 5 shows an example of a character list;

FIG. 6 shows an example of a pose table;

FIG. 7 shows an example of a motion table;

FIG. 8 shows a drawing list and a reference drawing list;

FIG. 12 shows an example of a character list created by sorting and arranging character positions in step S1 (FIG. 2).

DETAILED DESCRIPTION OF THE INVENTION

Figure 1:
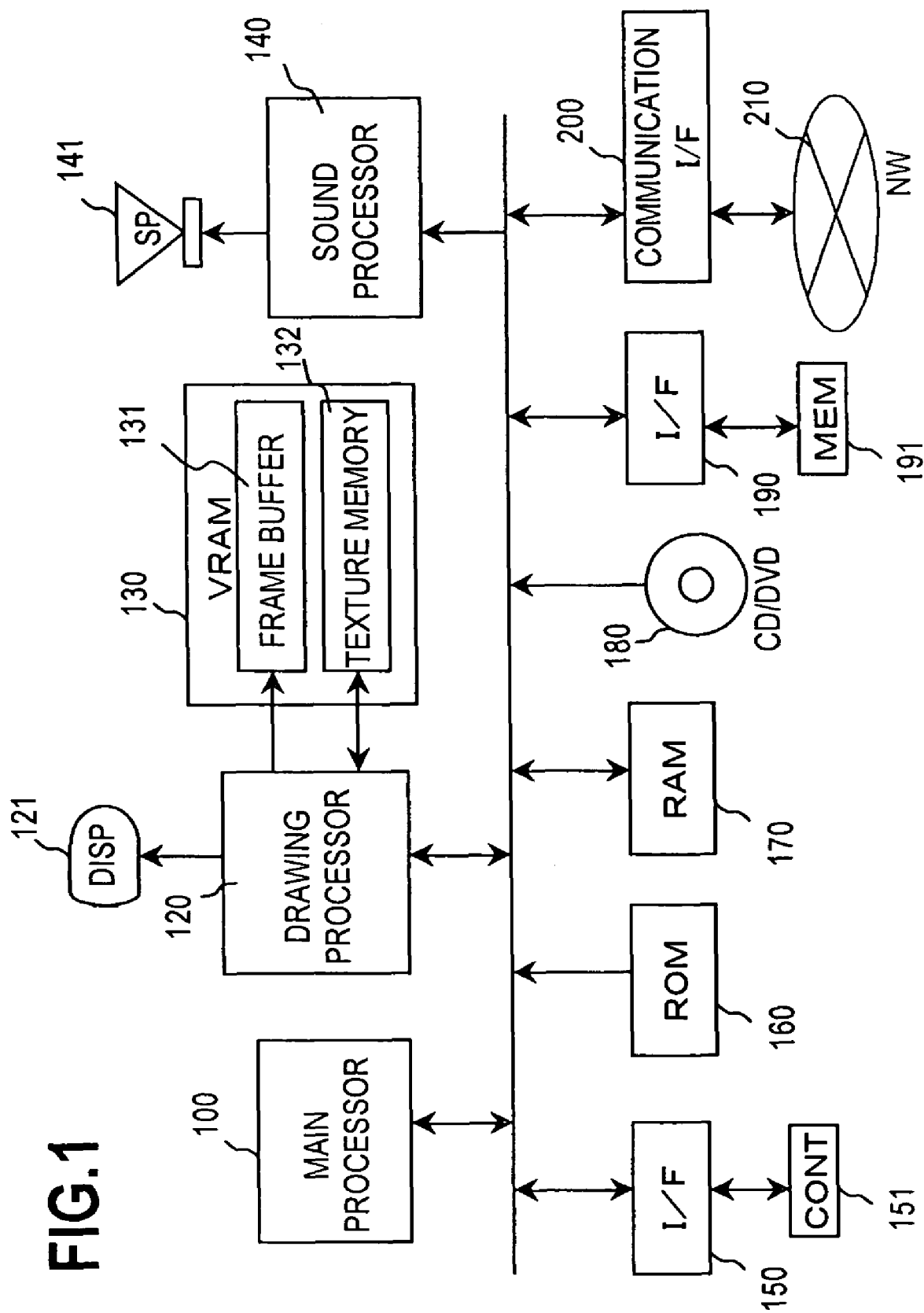
FIG. 1 shows an example of the configuration of a game system to which the invention is applied.

Below, embodiments of the invention are explained referring to the drawings. These embodiments are provided to aid understanding of the invention, but application of the invention is not limited to these. In particular, an example of an interactive game system which progresses in relation to operations by a game player is described below as an embodiment; however, based on the principle of the invention, application is also possible in general image processing systems in which processing is executed by means of a reproduction-specific program with no interactive properties (demonstrations, simulations, etc.).

FIG. 1 shows an example of the configuration of a game system to which the invention is applied. The configuration of this game system can be implemented in various modes. That is, use is possible as a home video game device, or as a commercial game device installed in a game center or arcade. In addition, this invention can be applied to independent game devices, and to configurations enabling game execution between a plurality of game devices over a network.

In FIG. 1, the main processor 1 executes game processing, image processing, and audio processing corresponding to operation signals and signal according to operation by a game player, based on a game program stored on CD/DVD or other disc-type ROM 180 or in semiconductor recording media 191 connected via an interface 190, or on a game program sent over a communication network 200 or over the Internet or another network 210. In addition to a CD/DVD or other disc-type ROM 180, a configuration is also possible in which processing is performed by means of a game program stored on a HDD or other magnetic recording media.

Further, coordinate transformations, perspective projection, light source calculations, and other geometrical processing is performed by the main processor 1, or by a coprocessor, not shown, provided separately from the main processor 1 as necessary.

Operation signals corresponding to operations by the game player are transferred via the interface 150 to the main processor 100 by the game controller 151.

A program to control the entire system, or in the case of commercial game equipment, a game program, is stored in the ROM 160.

The RAM 170 is main memory, and holds data for use in tasks during game execution.

The sound processor 140 generates, and outputs through a speaker 141, voice output corresponding to voice data created by the main processor.

Next, the drawing processor 120, VRAM 130, and display 121 are functional portions directly related to this invention.

The drawing processor 120 executes drawing processing for objects formed using polygons, volumes and similar. For each frame in which a game image is constructed, object data is sent from the main processor 100 to the drawing processor 120. At the same time, any necessary texture data is transferred to texture memory 132, configured in one area of VRAM 130, and stored. The drawing processor 120 generates textures corresponding to objects based on the object data sent from the main processor 100, and stores these in the texture memory 132 in VRAM 130.

Then, the order of polygons making up objects is sorted by means of a Z buffer or similar, and while performing hidden surface processing, textures stored in texture memory 132 are applied, and the image for one frame is drawn in the frame buffer 131, formed in a portion of VRAM 130. At this time, any other image processing required by the game program, such as semitransparent processing, shading, and similar, is performed.

The image drawn in the frame buffer 131 is output and displayed on the display 121.

In particular, this invention characterized in the method by which, in the above processing, the texture of shadows formed by a plurality of characters appearing in the game is generated and drawn.

Figure 2:
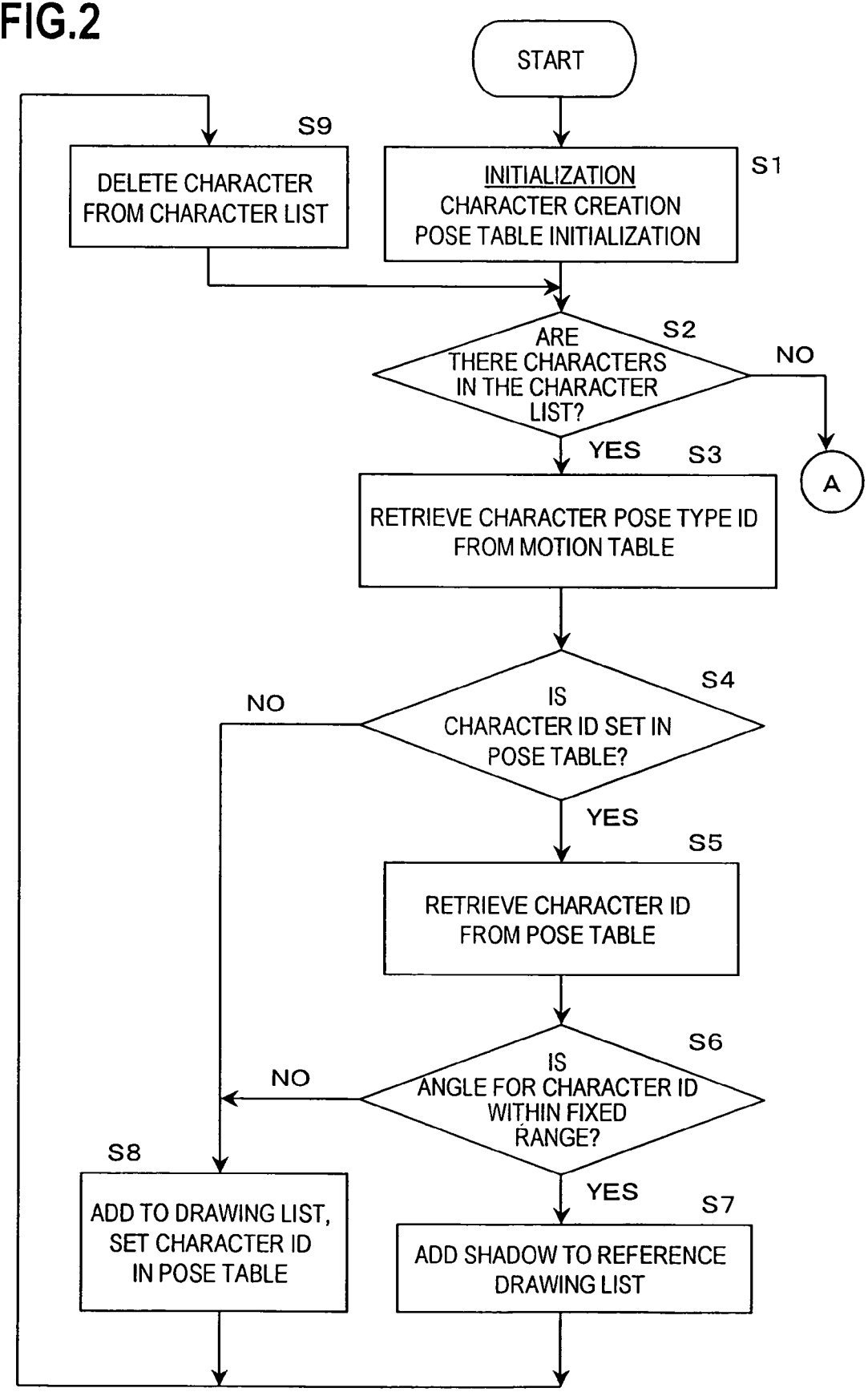
FIG. 2 is a flow diagram for creation of a data table for drawing.
Figure 3:
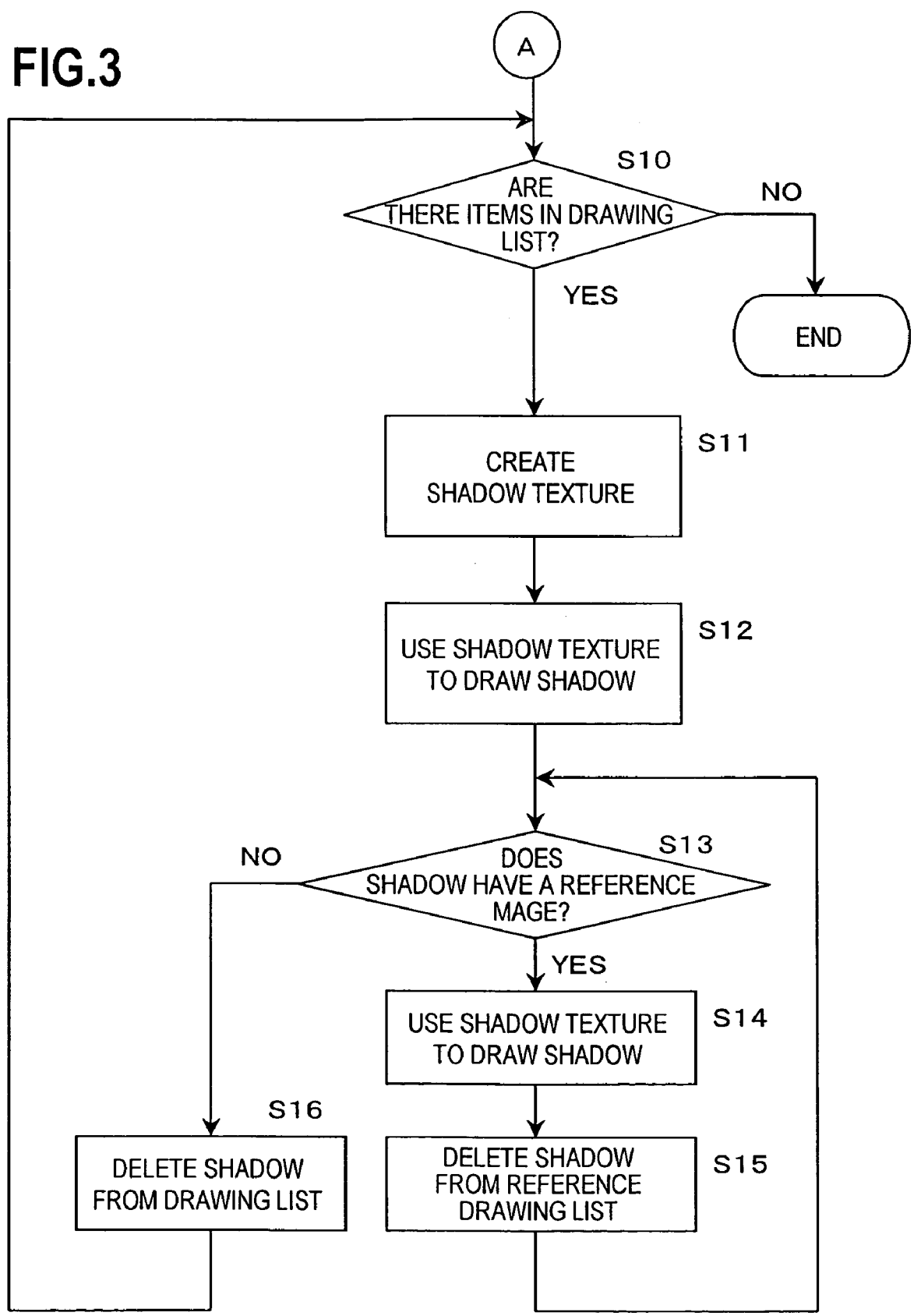
FIG. 3 is a flow diagram showing the procedure of drawing processing, executed according to a created data table.

FIG. 2 and FIG. 3 show the flow of processing by the drawing processor, controlled by execution of a texture formation program of this invention.

In particular, FIG. 2 shows the flow of creation of a data table for use in drawing, and FIG. 3 shows the flow of the procedure for drawing processing, executed according to the created data table. The flow of creation of the data table for drawing in FIG. 2 can also be executed by the main processor 100, rather than by the drawing processor 120.

The frame memory 131 and texture memory 132, which are logically formed in VRAM 130 for use in drawing, can also be configured as physically independent memory.

Figure 4:
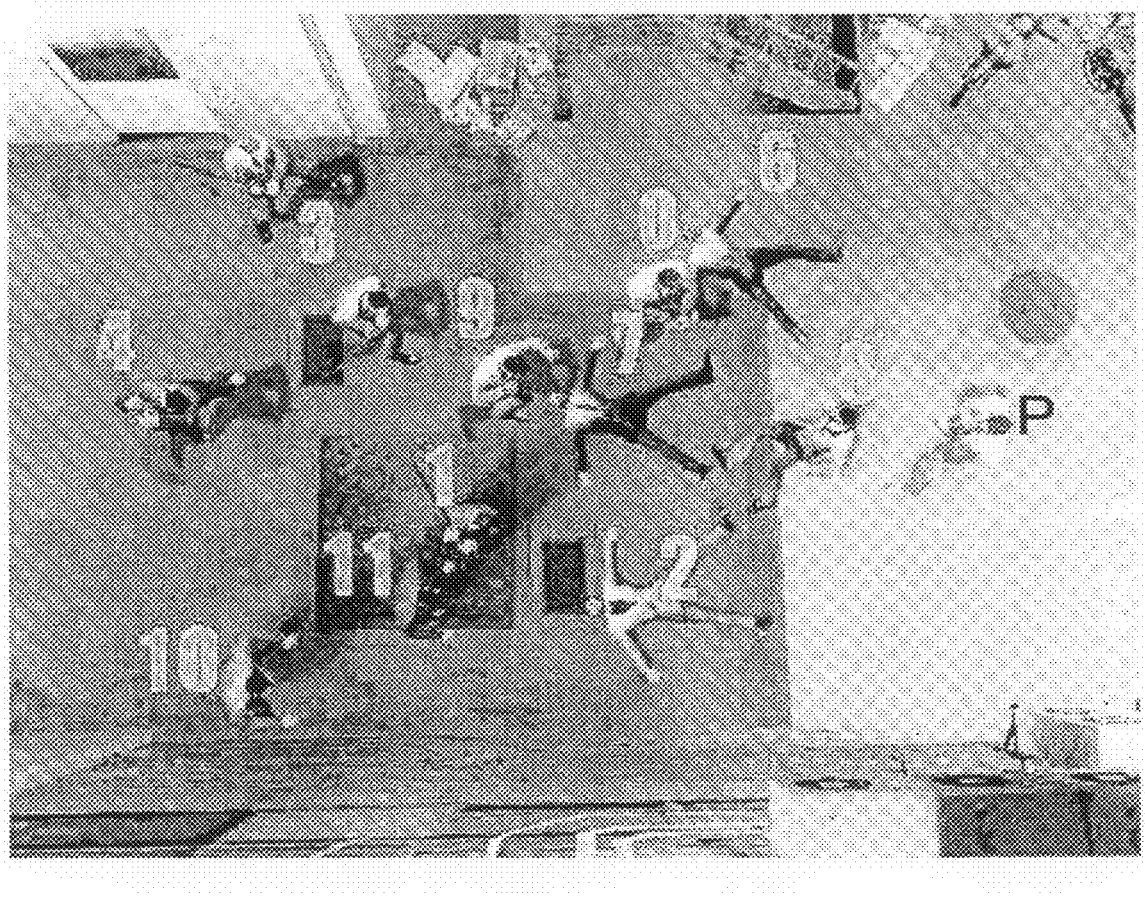
FIG. 4 shows a plurality of opposing characters observed from above, with the viewpoint camera positioned above in virtual three-dimensional space.

As an embodiment, as shown in FIG. 4, an image frame is considered in which a plurality of characters are opposing a character (player) P, operated by a player in a competitive game.

FIG. 4 shows the result of observing a plurality of opposing characters from above, with the viewpoint camera positioned above in virtual three-dimensional space. Characters appearing in FIG. 4 and displayed are the character P operated by the game player, and the plurality of characters 0 through 11 opposing the player P.

Also, a light source which can be formed as a standard point light source, or a linear light source, planar light source, parallel-beam light source, or similar, is set in the virtual three-dimensional space. As a result, light shines from the left-hand direction of the image toward the player P. Hence shadows corresponding to the respective poses of the plurality of characters 0 through 11 are formed so as to extend in the direction of the character P.

As explained above, on the occasion of drawing processing in the prior art, shadow textures must be generated for each of the plurality of characters 0 to 11, and consequently the load on the processor is increased, and there are concerns that fast processing may not be possible. The present invention resolves such difficulties.

Returning to FIG. 2, when drawing processing starts, data for characters to be displayed in the frame is sent from the main processor 100 to the drawing processor 120. Based on this, as initialization processing for the frame, the drawing processor 120 creates a character list which sorts and arranges the plurality of characters displayed in the frame to be drawn, based on the distance from the coordinate position of the character P, which is the object of operations by the game player closest to a specific coordinate position, such as for example the point-of-view coordinates.

Further, a pose table is generated which associates, for each character, flags specifying pose for the character (step S1).

The generated character list and post table are stored in the drawing processor 120, or in main memory 170.

FIG. 5 is an example of a character list. Characters appearing in the frame image in question are sorted and listed, in order from the shortest distance from player P. Character IDs are identifiers which specify corresponding characters.

FIG. 6 is an example of a pose table. A pose table is a table which, for prescribed pose IDs, which in this embodiment are pose IDs specifying the poses "ready", "fallen" and "rising", specify the character IDs of characters displayed in the relevant poses.

That is, a pose ID is an identifier which specifies a category of the same poses (postures); postures which differ to some extent are treated as belonging to the same pose ID.

In actuality, compared with the "ready" and "fallen" poses, shadows generated in association with rising poses have no common points in the shape of the shadow compared with the ready and fallen poses. For this reason, it is preferable that "rising" poses not be handled as the same pose, that is, as a reference pose, and that "other" poses including all poses other than "ready" and "fallen" be handled as reference poses.

This is because, if the shadow of a character in one rising pose is used as a reference shadow for a character in another rising pose, because the postures of the rising poses are different, a substantial sense of unnaturalness occurs. Hence reference shadows are not used for poses handled as "other" poses.

However, even in cases of poses handled as "other" poses, as an exception, if the motion ID is within the same category, a reference shadow may be generated. The motion ID is an identifier specifying the poster for each time duration (for example, for each frame) in a series of motion of a character corresponding to progress of the game program, as explained in the motion table shown in FIG. 7.

Here "posture" is different from the above "pose". That is, the above-described "pose" is a higher-level concept which includes states in the same category, whereas a "posture", specified by a motion ID, is a specific example. For example, a motion ID specifies a single unique relative positional relationships between the torso, head, arms, legs, and similar of a character.

Hence even poses handled as the above-described "other" may validate the function for generation of a reference shadow, if the motion ID is within the same category. The probability of validation of this function is probably low, but in an action game in which an attack is executed simultaneously on a plurality of enemies, the characteristics of the game may be such that that the same "defeated" motion is repeated by the enemies, and so it is advantageous to generate a reference shadow using the same motion ID.

In relation to the above, in addition to "ready" and "fallen", such poses as "running", "walking", "crouching", and similar can be handled as within the same pose category.

After initialization processing, loop processing from step S2 to step S9 is performed until there are no more character IDs in the character list shown in FIG. 5 (NO in step S2), to determine how shadows are to be drawn for characters in the sorted order.

In step S3, the pose ID for the character is acquired from the motion table. Here, related data corresponding to each character motion, prepared in advance, is registered in the motion table, corresponding to the game program.

In the motion table shown in FIG. 7, motion numbers (NO) are set in advance as motion IDs appearing in an order corresponding to progress of the game program. And, in FIG. 7, an example is shown in which pose IDs are registered corresponding to each of the plurality of motion IDs set in advance. For example, motion IDs of 1, 3, m and n are defined as being drawn as a "fallen" pose, and the corresponding "fallen" pose ID is registered.

Similarly, motion numbers 2, m+1, m+2, and n−1 are defined as being drawn as a "ready" pose, and the corresponding "ready" pose ID is registered. And, motion 4 is defined as being drawn as a "rising" pose, and the corresponding "rising" pose ID is registered.

First, the "fallen" pose ID is acquired from this motion table (step S3). Based on this acquired "fallen" pose ID, the pose table shown in FIG. 6 is referenced, and a judgment is made as to which of the character IDs is set (step S4). In the example shown in FIG. 6, the drawn characters ID 1, ID 6, ID 7 are registered as being in the "fallen pose".

If a character ID is registered in the pose table (YES in step S4), the registered character ID is acquired from the pose table (step S5). Then, a judgment is made as to whether the character orientation (angle) corresponding to the acquired character ID is within a prescribed range with respect to the direction of the above specified coordinate position, and if within the prescribed range (YES in step S6), the shadow for this character is registered in a reference drawing list (step S7).

Registration on this reference drawing list means that shadow textures already created for other characters can be referenced (reused).

On the other hand, when in step S4 a character ID is not set in the pose table (NO in step S4), or when in step S6 a character orientation (angle) is judged not to be in the prescribed range with respect to the specified coordinate position (NO in step S6), an addition is made to the drawing list, and the character ID is set in the pose table (step S8).

Here, the drawing list and reference drawing list are as shown in FIG. 8. That is, in FIG. 8, the first field I is the drawing list, indicating the IDs of characters for which shadow textures are to be originally created.

For example, in the frame display example of FIG. 4, character ID 6, assuming a "fallen" pose, character ID 0, assuming a "ready" pose, and character ID 8, assuming a "rising" pose, as well as character ID 2, which similarly assumes a "fallen" pose but the character orientation (angle) of which is not within the prescribed range relative to the specified coordinate position direction (NO in step S6), are set in the drawing list I, indicating that new shadow textures should be created.

Further, in FIG. 8, the reference drawing list II shows character IDs the original shadows of which can be referenced, that is, reused. For example, the shadow texture for the "fallen" pose created for ID 6 can be referenced as the character shadow of character ID 7.

Similarly, the shadow texture for the "ready" pose created for character ID 0 can be referenced as the character shadow for character IDs 9, 3, 5, and 4.

There are no characters set to reference the shadow texture for the "rising" pose created for character ID 8, or the shadow texture for the "fallen" pose created for character ID 2.

When, for one character, addition to the drawing list and setting of the character ID in the pose table are performed (step S8), the character ID which has been set is deleted from the character list (see FIG. 5) (step S9). Hence the above processing is completed until there are no more character IDs set in the character list. (NO in step S2).

Next, based on the drawing list I and reference drawing list II shown in FIG. 8 and created as described above, drawing processing is performed according to the processing flow of FIG. 3.

In FIG. 3, the drawing processor 120 first determines the character ID 6 registered corresponding to the first pose ID from the drawing list I (step S11).

Then, from the pose table of FIG. 6, the drawing processor 120 finds that the pose for the character ID 6 thus determined is a "fallen" pose, creates the corresponding shadow texture, and stores the result in texture memory 132 (step S11).

At the same time, the drawing processor 120 sends the created shadow texture to the frame buffer 131, and draws a shadow (step S12).

Next, the reference shadow drawing list II is searched, and a search is performed for registered character IDs which use the shadow texture for the character ID 6 registered in the drawing list I as a reference shadow (step S13).

If there is a corresponding registered character ID which uses the shadow texture of character ID 6 as a reference shadow (YES in step S13), then the texture memory 132 is accessed, the stored shadow texture of character ID 6 is read out, and is used to draw the same shadow in the frame buffer 131 (step S14). At this time, in the shadow drawing processing, the shadow texture applied may be enlarged, reduced, or rotated and applied, according to the size and orientation of the corresponding character.

When the shadow texture of character ID 6 is used in reference drawing, the registration of character ID 7, registered as using the shadow texture of the character ID 6 as a reference shadow, is deleted from the reference drawing list II (step S15).

This processing from step S13 to step S15 is continued according to one character ID, until there are no longer any registered objects in reference drawing list II for one pose (NO in step S13).

Then, when reference drawing processing ends for all character IDs to be referenced which are registered in reference drawing list II for one character ID, registration of the character ID to be referenced is deleted from the drawing list I, and at the same time, all the character IDs using the reference drawing registered in the reference drawing list II are deleted (step S16).

Processing returns to step S10, and the above processing from step S11 to step S16 is performed until there are no more character IDs for shadow texture creation registered in the drawing list I (NO in step S10), after which drawing processing ends.

Figure 9:
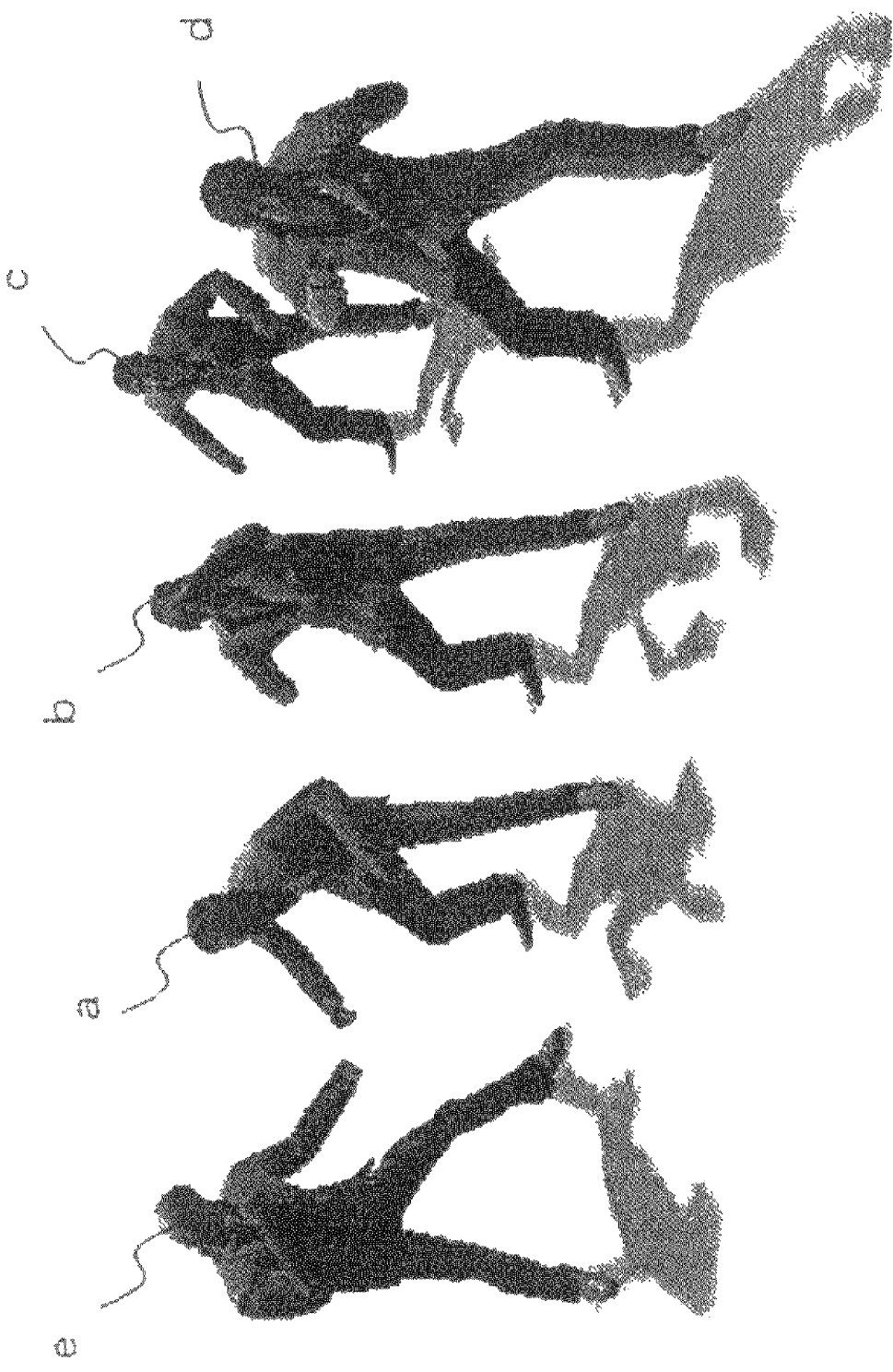
FIG. 9 shows an image display example in one embodiment of the invention.

FIG. 9 shows an example of the display of shadows which have been formed and drawn by a method of the prior art, for comparison with an application example of this invention. In this example, all of the characters a, b, c, d, and e are displayed with their own shadows, without using reference shadows. A background image is omitted.

Figure 10:
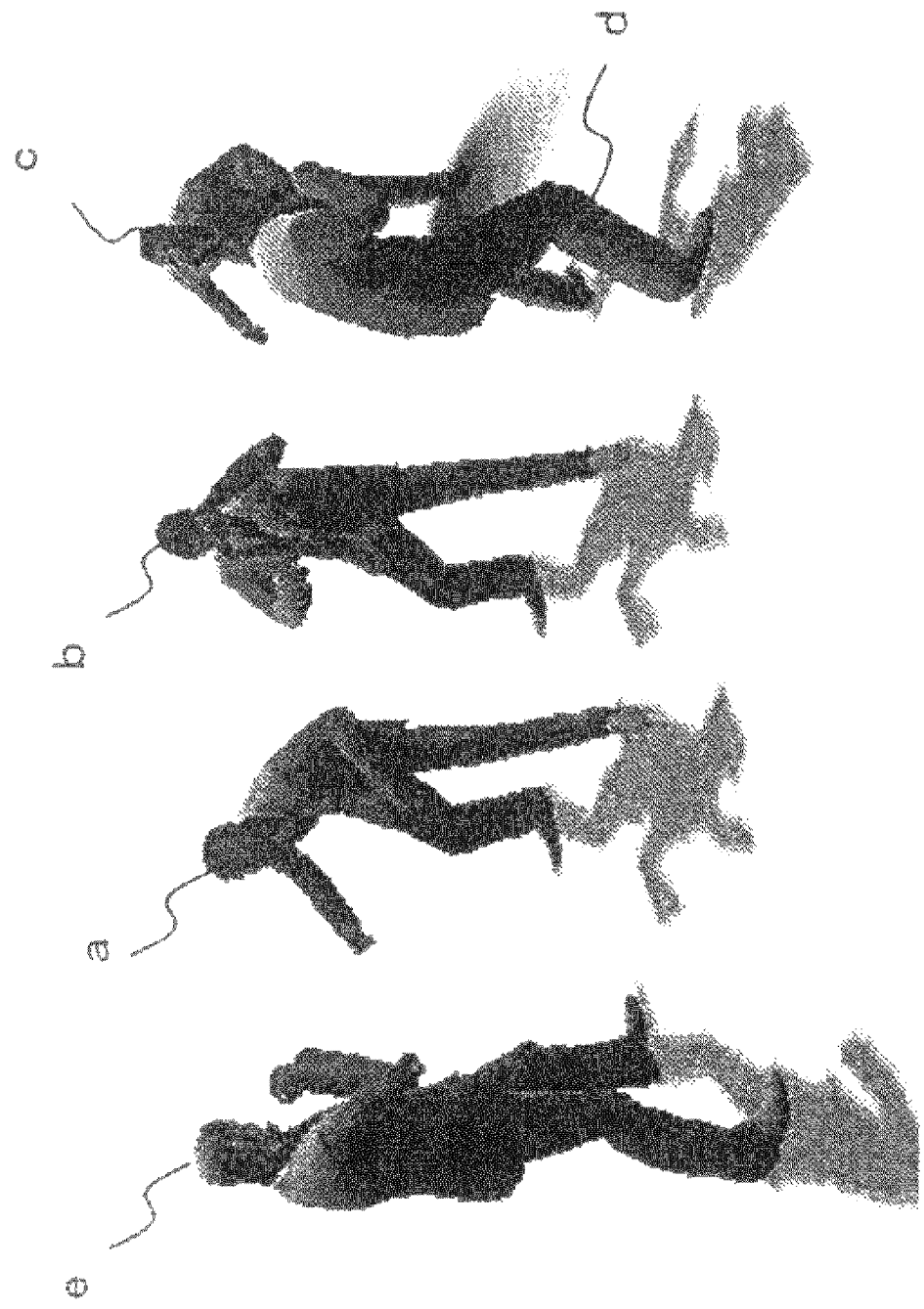
FIG. 10 shows an image display example in another embodiment of the invention.
Figure 11:
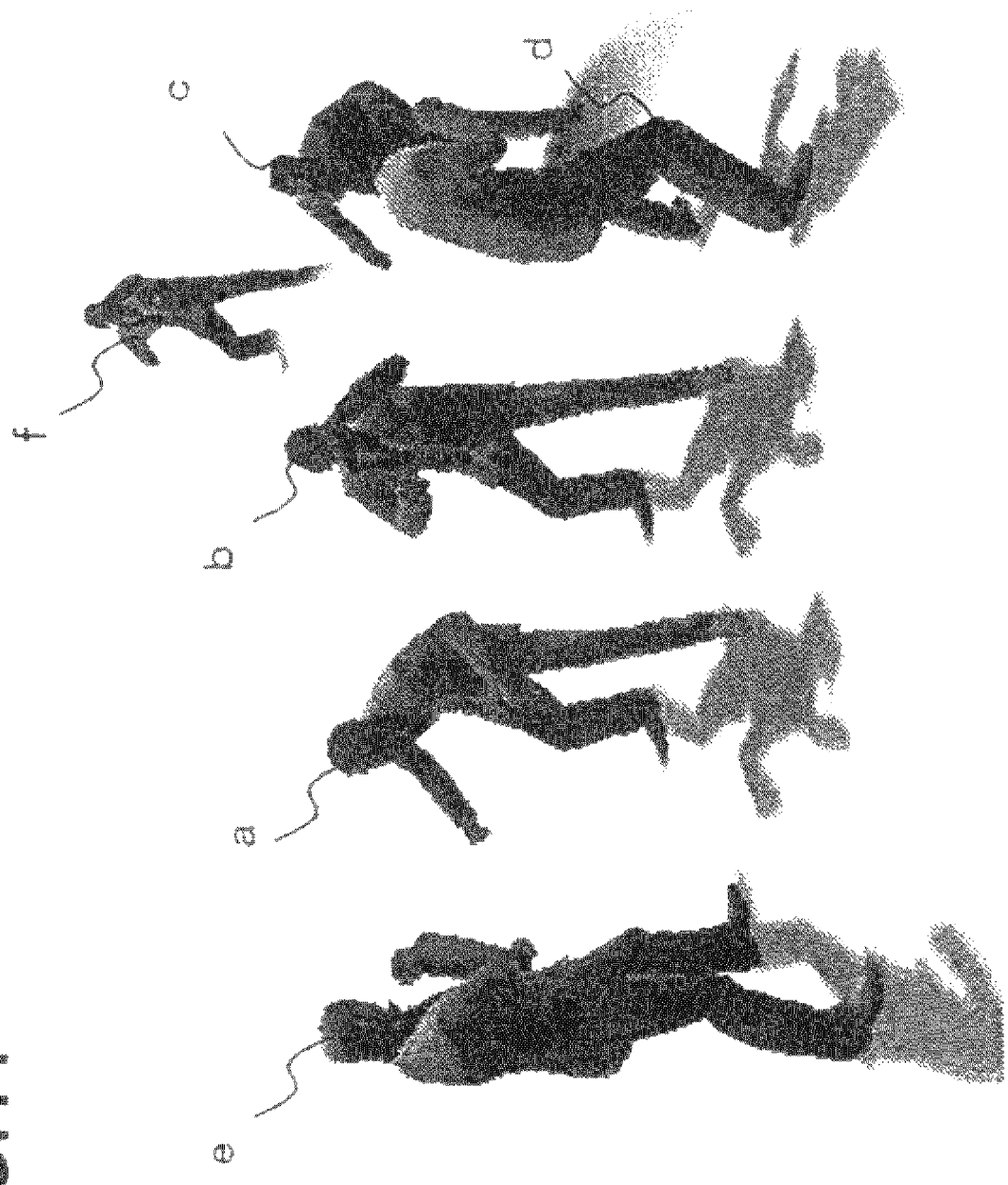
FIG. 11 shows an image display example in still another embodiment of the invention.

FIG. 10 and FIG. 11 shows an example of an image drawn by applying this invention. Similarly to FIG. 9, a background image is omitted.

In the example shown in FIG. 10, when drawing the shadow for character b, the texture of the shadow created for character a is referenced and reused. For each of characters d and e, newly created shadow textures were used.

Hence the processing by the drawing processor 120 to create the shadow texture for character b and to store the texture in texture memory 132 can be omitted. By this means, the load on the drawing processor 120 can be reduced.

Further, in FIG. 10, the shadow for character c is formed using an approximate shadow. This is done for the following reason. When the distance from the specific coordinate position to the character position exceeds the prescribed value, the image of the character is displayed as a smaller image compared with the other characters. In this case, no sense of unnaturalness is imparted to the game player even if the shadow does not have a shape corresponding to the shape of the character. Hence when the distance from the specific coordinate position to the position of the character c exceeds the prescribed value, a shadow texture having a prescribed shape, such as for example a circular shape, can be used in drawing, enabling reduction of the load on the drawing processor 120.

Moreover, when, regardless of distance, the display size of a character on the display screen is smaller than a prescribed size, an approximate shadow (or round shape shadow) may be used. FIG. 11 is an example of a screen display in another embodiment of the invention; drawing of a shadow is omitted for character f. Here character f is at a position even further distant from the specific coordinate position than character c in FIG. 10, and in this case the character display is smaller still, so that no sense of unnaturalness is imparted even if a shadow is not drawn.

As a condition for generation of an approximate shadow, a case was explained which is based on distance, in which an approximate shadow is generated when the distance from the character (player) operated by the game player is equal to or greater than a prescribed distance. However, although use may be based on distance as explained above, in a more preferred aspect, rather than using distance, shadow types with higher precision can be used in order of higher priority, such as for example the order of closeness to the player, and either approximate shadows or no shadows can be displayed for characters of less importance.

Here, in the above embodiment, it is possible to search for characters for which to generate actual shadows such that the number of reference shadows is maximum. However, because actual shadows tend to change according to circumstances, the shape of shadows changes each time a character for which an actual shadow is drawn changes, and as a result there is the drawback that frequent switching between shadows occurs.

The load associated with shadow drawing is normally heavy compared with simple addition and search processing, so that even if a search of a certain degree of complexity is performed, the overall load on the drawing processor can be reduced.

Hence as one measure, it is also possible to set the parameters of the virtual characters in advance, to some degree, in order to generate the shadows most frequently used, given an understanding of the game characteristics.

For example, in the competitive game shown in FIG. 4, shadows often used with virtual characters may for example be "shadows of players in a 'ready' pose facing other players", or "shadows of players which have been attacked and are falling to the ground". By using such virtual characters, it is possible to continue to use the same types of shadows continuously for characters creating shadows, without being affected by outside influences.

By this means, it is possible to avoid phenomena in which, when a virtual character is not used, the shape of a shadow suddenly changes at the instant the referenced character is switched.

Further, in order to reduce the drawing load, it can be made possible to freely adjust the parameters of virtual characters to a certain degree, so that the probability that a reference shadow will be effectively used can be increased.

Here, another embodiment is considered from the standpoint of further increasing the use of reference shadows to the extent possible. In the other embodiment, the concept of the shadow of a virtual character which is not actually drawn on the screen (a virtual actual shadow) is utilized.

FIG. 12 is an example of a character list created by sorting and arranging the positions of a plurality of characters in step S1 (FIG. 2).

For example, in a competitive game, the plurality of characters (enemies) which compete with a character (player) operated by the game player are sorted and arranged in the order of distance from the player position (sort order CH1 to CH22). Characters corresponding to the sort order CH1 to CH4 are characters in positions closest to the player, and the movements of these players are intense.

Hence as the texture of shadows for the characters corresponding to CH1 to CH4, actual shadows are used. In FIG. 12, although not listed, the character (player) which is operated by the game player is important, and so an actual shadow is used.

Next, drawing of the texture of shadows for the characters corresponding to CH5 through CH14 does not entail drawing actual character shadows; instead, virtual representative or average shadow textures created in advance (virtual actual shadows) are prepared, and these can be used in drawing.

That is, for the characters CH5 through CH14, the shadow of a virtual character (a virtual actual shadow), which is not actual drawn on the screen is created in advance, and this shadow of a virtual character (virtual actual shadow) is used as reference with characters the pose of which matches the pose of the virtual character to perform drawing.

In the example shown in FIG. 12, a virtual character shadow (virtual actual shadow 1) which is not actually drawn on the screen is created for the characters CH5 through CH10, and a reference image referencing this is used. For character CH11, there exists no other character in the same pose category, and so its own actual shadow is used.

The character CH12 is in the same pose category as the character CH2, and so a reference image which references the actual shadow of CH2 is used.

Further, for the characters CH13 and CH14, a virtual character shadow (virtual actual shadow 2) which is not actually drawn on the screen is created, and reference images which reference this shadow are used.

Here, it is important that when generating a virtual character, the virtual character parameters (angle and motion) be set such that reference shadows can be used in drawing as much as possible for the characters and motion currently present.

To facilitate understanding, an example is explained in which an angle is used as a virtual character parameter.

A case is considered in which there are six characters which, in order from the closest to the player, are oriented in the directions 0, 10, 20, 30, 40, and 50°. If the angular difference allowable range enabling drawing using the actual shadow as a reference image is less than 30°, then when the character oriented at direction 0° is drawn using the actual shadow, then this actual shadow can be used as a reference shadow to draw the two characters oriented at 10° and 20°.

However, a load must be imposed on the processor to generate a new actual shadow for the character oriented at 30°; and when all the shadows are drawn, the drawing load is as follows.

Character oriented at 0°: Actual shadow

Character oriented at 10°: Reference shadow

Character oriented at 20°: Reference shadow

Character oriented at 30°: Actual shadow

Character oriented at 40°: Reference shadow

Character oriented at 50°: Reference shadow

In contrast, a search is performed for angles (orientations) of the virtual character from 0° to 360°, and the angle is set to the angle for which the number of reference shadows is greatest.

For the above example (with six characters oriented at 0, 10, 20, 30, 40, and 50°), as the virtual character, a character oriented at 25° is generated. This character is not actually drawn on the screen.

At this time, the orientations of all of the characters are from 25° to less than ±30° of the orientation of for the virtual character, and so are within the angular difference allowable range enabling drawing using the same actual shadow (virtual actual shadow) as a reference image. Hence drawing can be performed using the actual shadow of the virtual character (the virtual actual shadow) as a reference image for all six characters oriented at 0, 10, 20, 30, 40, and 50°. By this means, the drawing load can be reduced.

That is, the drawing load for virtual character shadows is due only to creation of a projected texture, and so is the drawing load for one actual shadow (=drawing load for one virtual actual shadow)+drawing load for six reference shadows, and because the load for reference shadows is light compared with the load for actual shadow creation, overall processing is reduced.

In FIG. 12, approximate shadows created in advance are used to draw shadows for characters in the sort order CH15 to CH19. Drawing of shadows is omitted for characters in the sort order CH20 to CH22.

As explained above referring to the figures, by means of this invention shadow textures for characters can be created effectively and shadow drawing performed according to the characteristics of the display image scene. By this means, increases in the load on the drawing processor can be avoided. Further, image display can be performed without imparting a sense of unnaturalness to the game player, and without lowering the display quality.

Further, this invention is not limited to the above embodiments, and the technical scope of this invention extends to the inventions described in the scope of claims, and to inventions equivalent thereto.

The invention claimed is:

1. An image drawing program stored in a non-transitory storage medium-readable by an image processing system comprising a drawing processor which generates character image data corresponding to character data read from memory, texture memory which stores textures to be applied to characters, and frame memory to which characters applied with the textures are drawn, the image drawing program executing control to cause the drawing processor to display, on a display screen of the image processing system, an image of a plurality of characters positioned in virtual three-dimensional space in a view from a prescribed viewpoint, and an image resulting from perspective projection onto a two-dimensional plane, the image drawing program executing a process comprising the drawing processor, and forming character image data corresponding to the character data by perspective projection of the plurality of characters from a viewpoint set in virtual three-dimensional space;

drawing the character image data formed by the drawing processor in frame memory;

when images of shadows to be displayed corresponding to images of characters drawn in the frame memory are drawn, generating the texture of a shadow to be applied corresponding to the shadow of one character within a respective pose category, and storing the texture in the texture memory; and drawing the texture of shadows of the characters to be drawn, which are set to the same pose category as the one character by using the shadow texture, stored in the texture memory and to be applied corresponding to the one character, the drawing processor taking the one character shadow as a shadow of a character, not actually drawn on the screen, which, for a prescribed parameter, matches the conditions of the parameter selected such that the number of characters which can use the one character shadow as a reference shadow is increased.

2. The image drawing program according to claim 1, wherein, when the prescribed parameter is an angle, the drawing processor sets the shadow of the virtual character not actually drawn on the screen to the shadow of a virtual character at an angle selected such that the number of characters which can use the one character shadow as a reference shadow is increased within a prescribed angular difference allowable range.

3. The image drawing program according to claim 1, wherein, when the character to be drawn, which is set in the same pose category as the one character, is oriented in a direction toward a specific coordinate position in the virtual three-dimensional space which is not in a prescribed range, the drawing processor generates a texture for a shadow to be applied corresponding to the character to be drawn itself.

4. The image drawing program according to claim 1, wherein, when drawing an image of a shadow to be displayed corresponding to a character image drawn in the frame memory, the drawing processor draws a shadow of a character in a position distant by a prescribed distance or greater from the specific coordinate position in virtual three-dimensional space in the frame memory by applying a texture in a prescribed shape, stored in advance in the texture memory.

5. The image drawing program according to claim 1, wherein, when drawing an image of a shadow to be displayed corresponding to a character image drawn in the frame memory, the drawing processor draws the shadows of characters the display size on the display screen of which is equal to or smaller than a prescribed size in the frame memory by applying a texture in the prescribed shape, which is stored in advance in the texture memory.

6. The image drawing program according to claim 1, wherein the drawing processor applies the shadow texture stored in the texture memory to one character, by enlarging, reducing, and rotating the shadow texture according to the size and orientation of the corresponding character.

7. The image drawing program according to claim 1, wherein, when drawing an image of a shadow to be displayed corresponding to a character image drawn in the frame memory, the drawing processor applies a texture in a prescribed shape, stored in advance in the texture memory, for characters positioned in a range equal to or greater than a first distance from and up to a second distance from the specific coordinate position in the virtual three-dimensional space, and does not perform shadow drawing for characters in positions at a distance equal to or greater than the second distance.

8. The image drawing program according to claim 1, wherein, when drawing an image of a shadow to be displayed corresponding to a character image drawn in the frame memory, the drawing processor applies a texture a texture in a prescribed shape, stored in advance in the texture memory, for characters the display size on the display screen of which is equal to or less than a first size and equal to or greater than a second size, and does not perform shadow drawing for characters of size less than the second size.

9. An image processing system comprising:
a drawing processor, which performs perspective projection from a viewpoint set in the virtual three-dimensional space of the plurality of characters and forms character image data corresponding to the character data;
a frame memory, in which is drawn an image of the characters by means of the character image data formed by said drawing processor; and
a texture memory, which stores textures to be applied when drawing character images in the frame memory,
wherein when images of shadows to be displayed corresponding to images of characters drawn in the frame memory are drawn by the drawing processor, the drawing processor generates the texture of a shadow to be applied corresponding to a shadow of one character within a respective pose category, stores the texture in the texture memory, and uses the shadow texture stored in the texture memory and to be applied corresponding to the one character to draw the texture of shadows of the characters to be drawn, which are set to the same pose category as the one character, the shadow of the one character being a shadow of a virtual character, not to be actually drawn on the screen, which, for a prescribed parameter, matches conditions of the parameter selected such that the number of characters which can use the one character shadow as a reference shadow is increased.

10. The image processing system according to claim 9, wherein, when the prescribed parameter is an angle, the shadow of the virtual character not to be actually drawn on the screen is the shadow of a virtual character at an angle selected such that the number of characters which can use the one character shadow as a reference shadow is increased within a prescribed angular difference allowable range.

11. The image processing system according to claim 9, wherein, when the character to be drawn, set in the same pose category as the one character, is oriented in a direction toward the specific coordinate position in the virtual three-dimensional space not in a prescribed range, a texture is generated of a shadow to be applied corresponding to the character to be drawn itself.

12. The image processing system according to claim 9, wherein, when the drawing processor is caused to draw an image of a shadow to be displayed corresponding to a character image drawn in the frame memory, a shadow of a character in a position distant by a prescribed distance or greater from the specific coordinate position in the virtual three-dimensional space is drawn in the frame memory by applying a texture in a prescribed shape, which is stored in advance in the texture memory.

13. The image processing system according to claim 9, wherein, when the drawing processor is caused to draw an image of a shadow to be displayed corresponding to a character image drawn in the frame memory, the shadows of characters the display size on the display screen of which is equal to or smaller than a prescribed size are drawn in the frame memory by applying a texture in a prescribed shape, which is stored in advance in the texture memory.

14. The image processing system according to claim 9, wherein the shadow texture to be applied corresponding to the one character stored in the texture memory is enlarged, reduced, and rotated, according to the size and orientation of the corresponding character.

15. The image processing system according to claim 9, wherein, when causing the drawing processor to draw images of shadows to be displayed corresponding to character images drawn in the frame memory, a texture in a prescribed shape, stored in advance in the texture memory, is applied to be drawn in the frame memory for the shadows of characters positioned in a range equal to or greater than a first distance from and up to a second distance from the specific coordinate position in the virtual three-dimensional space, and shadow drawing is not performed for characters in positions at a distance equal to or greater than the second distance.

16. The image processing system according to claim 9, wherein, when causing the drawing processor to draw images of shadows to be displayed corresponding to character images drawn in the frame memory, a texture in a prescribed shape, which is stored in advance in the texture memory, is applied to be drawn in the frame memory for the shadows of characters the display size on the display screen of which is equal to or less than a first size and equal to or greater than a second size, and shadow drawing is not performed for characters of a size less than the second size.

17. An image drawing method for shadows to be displayed corresponding to character images, executed by an image processing system comprising a drawing processor which generates character image data corresponding to character data read from memory, texture memory which stores textures to be applied to characters, and frame memory to which characters applied with the textures are drawn, and in which the drawing processor displays, on a display screen of the image processing system, an image of a plurality of characters positioned in virtual three-dimensional space in a view from a prescribed viewpoint, the image resulting from perspective projection onto a two-dimensional plane, the image drawing method comprising:
forming character image data corresponding to the character data by perspective projection of the plurality of characters from a viewpoint set in virtual three-dimensional space;
drawing the character image data formed by the drawing processor in frame memory;
when images of shadows to be displayed corresponding to images of characters drawn in the frame memory are drawn, generating the texture of a shadow to be applied corresponding to the shadow of one character within a respective pose category, and storing the texture in the texture memory; and
drawing the texture of shadows of the characters to be drawn, which are set to the same pose category as the one character by using the shadow texture, stored in the texture memory and to be applied corresponding to the one character, the shadow of the one character being a shadow of a character, not actually drawn on the screen, which, for a prescribed parameter, matches the conditions of the parameter selected such that the number of characters which can be used use the one character shadow as a reference shadow is increased.

* * * * *